Nov. 12, 1940.   D. P. JOHNSON   2,220,905
OXYGEN REGULATOR
Filed Oct. 30, 1937   2 Sheets-Sheet 2

Inventor.
Daniel P. Johnson
By Ransom K. Davis
Attorney.

Patented Nov. 12, 1940

2,220,905

UNITED STATES PATENT OFFICE 2,220,905

OXYGEN REGULATOR

Daniel P. Johnson, Washington, D. C.

Application October 30, 1937, Serial No. 171,897

14 Claims. (Cl. 137—153)

(Granted under the act of March 3, 1883, as amended April 30, 1928; 370 O. G. 757)

The present invention relates to fluid regulators and more particularly to oxygen regulators for use on aircraft, for supplying oxygen to the cabin or to a mask worn by the pilot or passengers.

In supplying oxygen to a consuming device on aircraft, it is desirable that the quantity supplied be varied in accordance with changes in altitude. For example, at higher altitudes the quantity of oxygen available in the air decreases and it is particularly desirable that the oxygen supply be increased with an increase in altitude.

In devices of the prior art it has been the practice to utilize means actuated by changes in pressure with changes in altitude to control means which in turn control the supply of oxygen. These devices have been complicated and have also fallen short of the desirable standard which requires that the quantity of oxygen supplied be a linear function of the pressure.

It is, therefore, one of the objects of the present invention to provide a novel regulator wherein these undesirable conditions are eliminated.

A further object is to provide a novel oxygen regulator which shall eliminate the use of altitude actuated elements and which shall directly control the flow of oxygen.

Still another object is to provide a novel oxygen regulator wherein a linear relation between the pressure of the atmosphere and the quantity of oxygen supplied is continuously maintained.

A still further object is to provide a novel oxygen regulator, wherein the quantity of oxygen is automatically regulated in accordance with changes in pressure on changes in altitude by only a single element composed of porous material.

The above and other objects and advantages of the invention will appear more fully hereinafter from a consideration of the detailed description which follows, taken together with the accompanying drawings wherein are illustrated two embodiments of the invention. It is to be expressly understood, however, that the drawings are for the purpose of illustration and description only and are not designed as a definition of the limits of the invention, reference being had for this purpose to the appended claims.

In the drawings wherein like reference characters refer to like parts throughout the several views.

Figure 1:
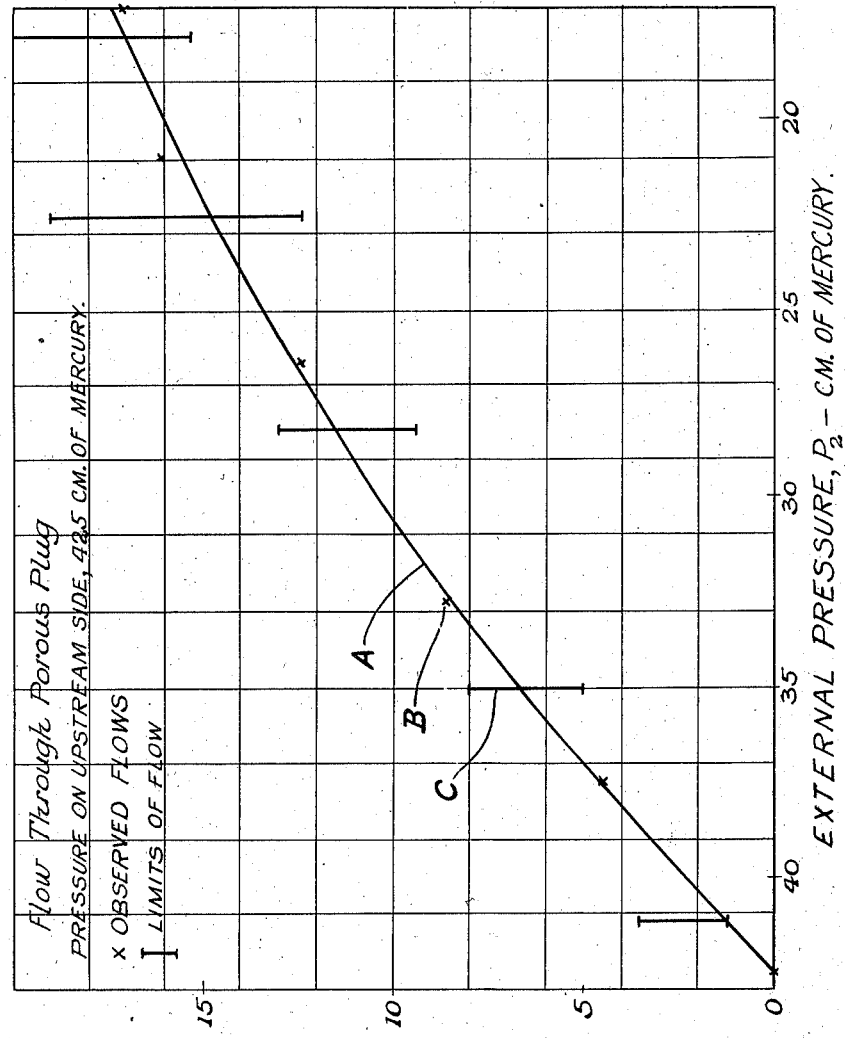
Fig. 1 is a graph illustrating the manner of change in the flow of a fluid through a porous plug of the present invention, with changes in pressure.

Referring to the drawings and more particularly to Fig. 1, A represents a curve illustrating the theoretical flow of a fluid through a porous plug of the invention, B represents the actual flow plotted with respect to the same scale as curve A, and C illustrates the permissible limit of variation of flow at the points where these lines cross the curve A. In order to better comprehend the operation of the device of the present invention it is deemed best to present a theoretical explanation of the principles involved therein.

In carrying out the objects of the present invention, a porous plug composed of "Kapox" or rock wool felted against a screen may be utilized. Other naturally porous materials can be used, an example of which is "Alundum" which has been employed with highly desirable results, "Alundum" being a trade name for a particular artificial aluminum oxide product. The particular material to be utilized is a matter of choice provided that the porosity thereof is such as to provide the results desired under the pressures available and within the limits of the dimensions of the structure embodying the invention.

It can be shown that if a porous plug be regarded as consisting of a large number of fine capillaries in parallel, the equation governing the flow in such a device may be put into the form:

(1) $$r_1 p_1 - r_2 p_2 = K_1 F$$

Where $r_1$ and $p_1$ are the density and pressure respectively of the gas at one side of the porous element, and $r_2$ and $p_2$ are the density and pressure respectively on the other side thereof, F is the flow measured under standard conditions and K is a constant proportional to the viscosity of the gas and inversely proportional to the porosity of the plug.

Assuming an isothermal flow, Equation 1 becomes:

(2) $$p_1^2 - p_2^2 = KF$$

Referring to Fig. 1, the curve designated by A was computed from Equation 2 for air, at a value of $p_1 = 42.5$ cm. of Hg and $K = 87$.

The observed points B indicate the values of flow of air through an "Alundum" plug when the pressure at one side thereof was maintained at 42.5 cm. of Hg, and the pressure on the other side was reduced to simulate the reduced pressures of the atmosphere as the altitude increases. The observed points are seen to approximate very closely the theoretical curve obtained by Equation 2. While curve A does not represent a linear function, the curve is seen to approach quite closely to a straight line.

From laboratory tests with a given plug and a given pressure drop across it, the flow of gas was found to vary inversely as the coefficient of viscosity. The behavior of oxygen, for example, is similar to that of air, varying only by a constant factor. Assuming a pressure of 30.5 cm. of Hg, the flow of air is seen from curve A to be ten liters per minute. With the viscosity of oxygen at 0.00020 and that of air at 0.00018 the flow of oxygen at 30.5 cm. of Hg would be $$10 \times \frac{0.00018}{0.00020}$$

or nine liters per minute. Given the curve of flow of air, that of oxygen under the same conditions can be readily computed and vice versa.

In Fig. 1, the permissible limits of oxygen flow variations changed in proportion to the ratio of the viscosities of oxygen and air are shown at C and it is, therefore, apparent that the flow through the porous plug is well within the limits of tolerance under present specifications for oxygen regulators used by the Army and Navy Air Services.

Figure 2:
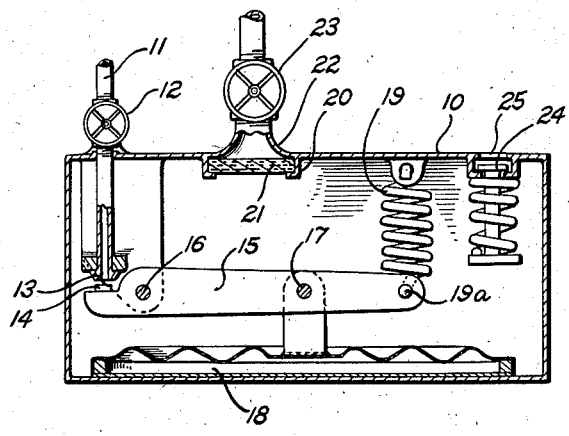
Fig. 2 is a side elevation, in section, of one embodiment of the invention.

In Fig. 2 is illustrated one novel form of the present invention embodying the principle of Fig. 1. Referring to Fig. 2, 10 indicates a casing into which projects a pipe 11 leading from a source of oxygen such as a tank under pressure (not shown), controlled by a valve 12 and emitted at nozzle 13 providing a base for a valve closure 14 mounted at one end of lever 15 pivoted at 16.

Pivotally attached to said lever intermediate its ends as at 17 is an evacuated diaphragm or aneroid 18 which is highly sensitive to changes of pressure within the casing 10. The spring 19 is connected to the other end of said lever at 19a and may be adjusted so that it just balances the force of the diaphragm 18 at a pressure within the casing equal to that at an altitude of 15,000 feet. Secured within brackets 20 is a porous element 21 through which the oxygen passes to pipe 22 controlled by valve 23 leading to the mask, aircraft compartment or other oxygen consuming devices. A relief valve 24 controls the opening 25, whereby the pressures in the casing 10 cannot rise above a certain pressure chosen as a limit of safety.

The operation of the device is as follows: Oxygen enters the interior of casing 10 by means of pipe 11, control valve 12 and nozzle 13 when valve 14 is moved from said nozzle. The device may be so adjusted that when the pressure within casing 10 is 42.5 cm. of Hg the evacuated diaphragm 18 and the spring 19 just balance lever 15 and valve 14 closes nozzle 13. Upon a reduction in pressure, spring 19 will move lever 15 counter-clockwise to open valve 14 whereby oxygen is admitted. If the pressure exceeds 42.5 cm. of Hg, the diaphragm will move lever 15 to close the valve. The pressure within casing 10 is thereby maintained constant. If the external pressure or the pressure of the atmosphere falls below that corresponding to 15,000 feet of altitude, there will be a flow of oxygen through plug 21. The lower the external pressure the greater the flow and the oxygen is therefore fed to the consuming device at a rate proportional to the increase in altitude. While the relationship of the flow of oxygen to the changes in pressure with changes in altitude is not a perfectly linear one, yet the flow is substantially linear down to the pressure at which the density of oxygen is too low for the user to obtain a sufficient amount even though pure oxygen be used.

In deriving Equation 2, it is assumed that the expansion of the gas in the plug was isothermal. Since the conductivity of the interior of the plug is not large, the flow more nearly approaches that obtained on the basis of an adiabatic expansion.

In the case of the simple regulator, the same flow will be obtained under either isothermal or adiabatic conditions at pressures near the opening point of the valve, while the flow at an external pressure of 18 cm. of Hg will be ten percent greater with adiabatic than with isothermal. The great simplicity and ease of operation of the device of Fig. 2 more than offsets this variance which, however, is still within the limits of variation and which can be further reduced by a proper choice of the constant K.

Figure 3:
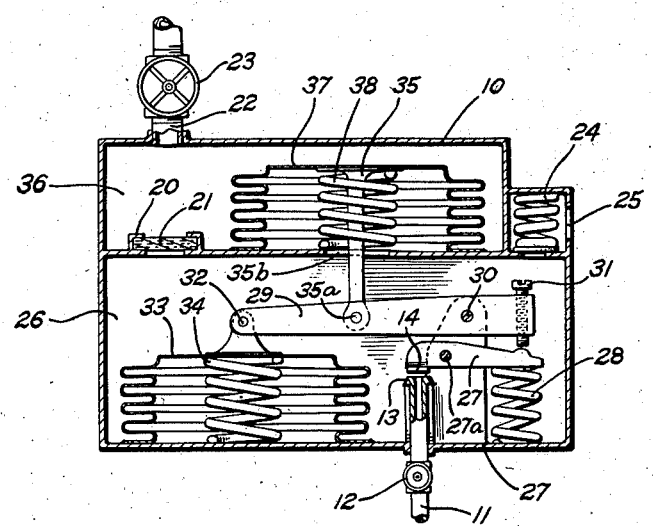
Fig. 3 is a side elevation, in section, illustrating another embodiment of the invention.

In Fig. 3 is illustrated another embodiment of the present invention in which true linearity between flow and pressure is obtained.

Designating the pressure in chamber 26 of casing 10 as $p_1$ and the pressure in outlet chamber 36 as $p_2$, if the reducing valve be made to close when the sum of the chamber and outlet chamber pressures exceeds a fixed value, then a linear flow may be obtained.

Assuming that $p_0$ is the pressure at which the device begins to function, if $$\frac{p_1+p_2}{2}=p_0$$

then $$p_1+p_2=2p_0$$

Elimination of $p_1$ between this equation and Equation 2 gives (3) $\qquad 4p_0(p_0-p_2)=KF$ wherein the flow is a linear function of the external pressure $p_2$ when $p_0$ is maintained constant.

Referring to Fig. 3, leading into chamber 26 is the pipe 11 controlled by valve 12 leading to nozzle 13 and controlled by valve 14 as set forth hereinbefore in the description of Fig. 2. Valve 14 is mounted on lever 27 for actuation about pivot 27a by means of spring 28. Lever 29, mounted on pivot 30 carries adjustable screw 31 at one end thereof for abutting against a lever 27 to actuate the same against the resistance of spring 28.

Pivotally connected to the opposite end of lever 29 at 32 is the aneroid diaphragm 33 resiliently urged to expanded position by spring 34. Arm 35 pivotally connected to lever 29 at 35a passes through the opening 35b in the partition between the chamber 26 and outlet chamber 36 and is connected to the bellows 37 which is resiliently urged to expanded position by spring 38.

Porous plug 21 is mounted in the partition between the chamber 26 and outlet chamber 36 and leads to the feed pipe 22 controlled by valve 23 as described above in connection with Fig. 2.

The operation of the device of Fig. 3 is as follows:

Assuming that the diaphragm and bellows are of equal area and that lever arm 32—30 is twice the length of lever arm 35a—30, the springs 28, 34 and 38 are so designed that the valve 14 is maintained closed at the external pressure at which it is desired to begin the supply of oxygen.

At this desired pressure, the pressure in the outlet chamber 36 and chamber 26 will be equal and equal to the external pressure. The pressure on bellows 37 is therefore zero. The pressure exerted on diaphragm 33 and the torque produced thereby will be just counterbalanced by the torque produced by the springs 34, 38. No force will be exerted by the lever 29 and the valve 14 will be maintained closed by spring 28.

Upon a decrease in external pressure the pressure in outlet chamber 36 will assume this new value. A differential pressure will then exist upon bellows 37 as the pressure in chamber 26 remains the same as previously. The upward force exerted on bellows 37 will produce a clockwise movement of lever 29 thereby depressing spring 28 and allowing valve 14 to open to thereby supply oxygen to the porous plug 21 and by means of pipe 22 supply oxygen to the consuming device.

As the pressure in chamber 26 rises, the force on diaphragm 33 will increase, thereby exerting a counter-clockwise torque on lever 29 until the torque due to bellows 37 is counterbalanced and the valve is again closed. A slight reduction in the pressure in either chamber 26 or outlet chamber 36 will cause valve 13 to open. The flow, therefore, may be so regulated as to maintain a constant differential of pressure between the chamber and outlet chamber, and the average pressure will remain substantially constant at the desired value. At smaller external pressures the action is similar. The spring 28 and the springs within diaphragms 33 and 37 are so designed that valve 14 opens when the average of the pressure in chamber 26 and outlet chamber 36 falls the slightest amount below $p_0$, whereby $p_1$ plus $p_2$ is maintained equal to $2p_0$ and linear function of Equation 3 is obtained so that a direct linear function will be maintained between the flow and the atmospheric pressure.

When the sum of the chamber and of the outlet chamber pressures is maintained constant within a range of 4 cm. of Hg, the present specifications for oxygen regulators can be satisfied with plugs of a porosity corresponding to values of K between 275 and 310

$$\frac{(cm. Hg)^2}{cu. ft. oxygen/min.}$$

With the linear regulator of Fig. 3, the difference in flow for isothermal and adiabatic flow is much smaller than with the device of Fig. 2, the difference amounting to less than 2 percent for external pressures greater than 18 cm. of Hg.

Means are thus provided whereby the pressure on one side of a porous plug is maintained constant or the average pressure on the two sides of said plug is maintained constant whereby an approximate linearity and a true linearity of flow with changes in pressure due to changes in altitude are obtained.

Although but two embodiments of the invention have been illustrated and described, further changes and modifications in form, materials and relative arrangements of parts, which will now appear to those skilled in the art, may be made without departing from the scope of the invention. Reference is, therefore, to be had to the appended claims for a definition of the limits of the invention.

The invention described herein may be manufactured and/or used by or for the Government of the United States of America for governmental purposes without the payment of any royalties thereon or therefor.

What is claimed is:

1. A gas flow regulator comprising a casing, means forming an inlet to said casing, valve means controlling said inlet, pressure responsive means, differential pressure responsive means cooperating with said pressure responsive means to control said valve means, and a porous element controlling the flow from said casing.

2. In a device of the character described, a casing, an inlet to said casing, an outlet from said casing, a partition separating said casing into two chambers, a porous element providing a passage through said partition, a diaphragm in one chamber, resilient means urging said diaphragm to an extended position, valve means controlling the inlet to said casing, a lever, means pivotally mounting said lever in said one chamber, said diaphragm being connected to said lever for actuation thereof, a second diaphragm mounted in the other chamber, means whereby the pressure in said one chamber is operative upon one side of said second diaphragm, and means connecting said second diaphragm with said lever whereby said valve is controlled by the cumulative effects of the pressures in both said chambers.

3. In a device of the character described, a casing, an inlet to said casing, an outlet therefrom, a partition in said casing, means providing a passage through said partition, an opening in said partition, a diaphragm mounted over said opening on one side of said partition, a second diaphragm mounted in the chamber formed between the casing and the other side of said partition, a valve controlling said inlet, and means whereby said diaphragms control the movement of said valve.

4. In a device of the character described, a casing, a partition in said casing, an inlet to said casing, an outlet therefrom, a porous element mounted to provide a plurality of minute direction changing passages through said partition, an opening in said partition, a diaphragm mounted over said opening and on one side of said partition, resilient means urging said diaphragm away from said opening, a second diaphragm mounted in the chamber formed between the other side of said partition and said casing, a valve controlling said inlet, lever means controlling said valve and connections between said diaphragms and lever means whereby the motion of said valve is controlled by said diaphragms.

5. A gas flow regulator comprising a casing, means forming an inlet to said casing, valve means cooperating with said inlet, means responsive to changes in pressure controlling said valve means, and a flow-retarding porous element having a selected porosity providing a plurality of irregular direction changing paths for controlling the flow of a gas from said casing, the porosity of said element being so selected that a linear relation is obtained between changes in pressure and the rate of flow of gas through said element.

6. In a device of the character described, a casing having an inlet and an outlet, a valve controlling said inlet, an aneroid, means connecting said aneroid and valve whereby said valve is actuated by pressure changes within the casing, a porous diffuser element having a selected porosity providing a plurality of direction changing paths, and means mounting said porous element in the outlet of said casing whereby the rate of flow therefrom is controlled in a linear relation to the changes in pressure external of said casing by virtue of the selected porosity of said element.

7. A gas flow regulator comprising a porous flow-retarding element having a selected porosity providing a plurality of direction changing paths and exposed to a changing pressure on one side, means supplying gas under pressure to the other side thereof, and means responsive to the combined pressures on the two sides of said porous element whereby the average of said pressures is maintained constant, the porosity of said element being so selected that a linear relation is obtained between changes in the pressure on the one side of said element and the rate of flow of gas through said element.

8. An oxygen regulator comprising a porous diffuser element having selected porosity providing a plurality of direction changing paths and exposed to a changing atmospheric pressure on one saide thereof, means controlling the flow of oxygen under pressure to the other side of said element, and means exposed to the pressures on both sides of said element whereby the sums of the pressures on both sides of said element are maintained constant, the porosity of said element being so selected that a linear relation is obtained between the changes in atmospheric pressure and the rate of flow of oxygen through said porous element.

9. In a device of the character described, a casing having an inlet, a valve controlling said inlet, pressure responsive means controlling said valve, and an aluminum oxide plug having a selected porosity providing an outlet from said casing, the porosity of said plug being so selected that a linear relation is obtained between changes in pressure external of said casing and the rate of flow of a fluid through said plug.

10. In a device of the character described, a casing having an inlet, a valve controlling said inlet, pressure responsive means controlling said valve, and a porous plug of rock wool having a selected porosity providing an outlet from said casing, the porosity of said plug being so selected that a linear relation is obtained between changes in pressure external of the casing and the rate of flow of a gas through said plug.

11. A gas regulator comprising a casing having an inlet, a valve controlling said inlet, pressure responsive means controlling said valve, and an outlet from said casing comprising means providing a plurality of capillaries in parallel and so constructed and arranged that a linear relation is obtained between changes in pressure external of the casing and the rate of flow of a gas through said outlet.

12. In a device of the class described, a casing having an inlet comprising a valve seat, an outlet from said casing comprising a porous member having a selected porosity providing a plurality of minute interstices, a diaphragm within said casing, a lever connected to said diaphragm for actuation thereby, a resilient element for opposing the movement of said lever by said diaphragm, and a valve carried by said lever and cooperating with said valve seat to open and close said inlet upon changes in pressure within said casing, the porosity of said porous member being so selected that a linear relation is obtained between changes in pressure external of the casing and the rate of flow of a gas through said porous member.

13. A gas flow regulator comprising a porous crystalline element having a selected porosity and exposed to a changing pressure on one side thereof, and means supplying gas to the other side of said element to cause said gas to flow therethrough, the crystalline structure and porosity of said element being so selected that the rate of flow of gas therethrough is approximately a linear function of changes in pressure on the one side thereof.

14. An oxygen regulator comprising a casing having an inlet through which oxygen enters said casing, and an outlet through which the oxygen passes out of said casing, said outlet comprising a porous plug having a selected porosity providing a plurality of direction changing passages, the porosity of said plug being so selected that the rate of flow of oxygen from said casing through said plug is a linear function of changes in atmospheric pressure.

DANIEL P. JOHNSON.